Dec. 2, 1924.

R. FAURE

HEATING APPARATUS

Filed July 2, 1923

1,517,622

INVENTOR
René Faure
BY
ATTORNEY

Patented Dec. 2, 1924.

1,517,622

UNITED STATES PATENT OFFICE.

RENÉ FAURE, OF PARIS, FRANCE.

HEATING APPARATUS.

Application filed July 2, 1923. Serial No. 649,071.

*To all whom it may concern:*

Be it known that I, RENÉ FAURE, citizen of the Republic of France, residing at Paris, France (post-office address 49 Rue Sarrette), have invented certain new and useful Improvements in Heating Apparatus, of which the following is a specification.

The object of my invention is to provide a heating apparatus burning gas or any other such like fuel, recuperating heat and effecting continuous ventilation.

My apparatus includes a readily adjustable burner of the ring or any other type, a recuperation chamber positioned above said burner and into which the whole of the heat given off by the burner is delivered, said chamber having extending vertically through it a set or nest of tubes, the ends of which open into the atmosphere; a device to lead hot gases from the burner around the tubes in the recuperation chamber; and a plate inside the recuperation chamber compelling hot gases to circulate or travel "bafflewise" so as to increase calorific efficiency. Furthermore my apparatus may, if required, be surrounded with or enclosed in a perforated jacket permitting ambient air to become heated by coming into contact with the heated wall of the recuperation chamber.

In order to make my invention more clearly understood I have illustrated, as an example, an embodiment thereof in and by drawings appended hereto and wherein—

Figure 1:
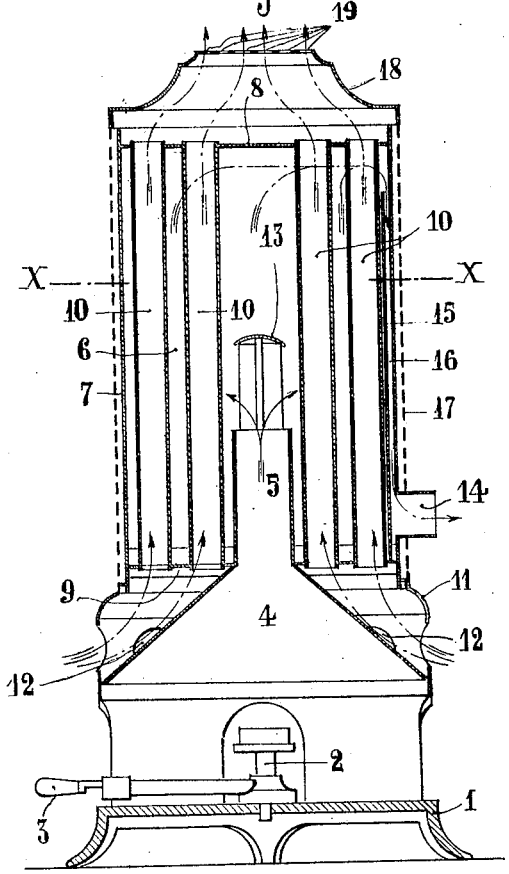
Figure 1 is a sectional elevation of my heating apparatus.
Figure 2:
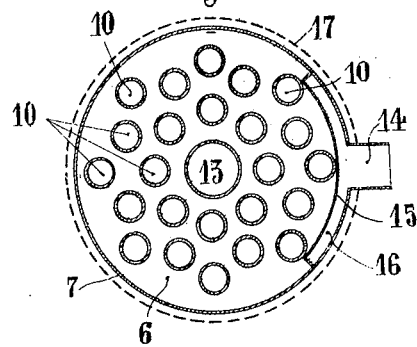
Figure 2 is a sectional plan thereof on line X—X of Figure 1.

I denotes the base of the apparatus.

On this base is arranged a burner 2, of any type adapted to burn coal gas or any other gaseous or liquid fuel, and provided with an adjusting or regulating device 3.

Said burner is set under a conical hood or funnel 4, the upper part of which terminates in a cylindrical chimney 5. The purpose of this hood is to lead into recuperation chamber 6, positioned above burner 2 the whole of the hot gases delivered by the latter and to prevent noxious combustion gases from mixing with the air that circulates through the ventilator tubes in the recuperation chamber.

Said recuperation chamber is constituted by an envelope, shell or casing 7, of cylindrical or any other suitable shape, the ends of which are closed by two perforated plates 8 and 9 carrying the ventilator tubes 10 that run right through the recuperation chamber and the ends of which freely communicate with the atmosphere of the room to be heated.

Said recuperation chamber is, as already explained, positioned above the burner and can be carried or supported by the body of the apparatus or by any suitable means or device, as for instance, by a jacket 11 forming an open-worked support, and pierced with holes 12 which permit the bottom ends of tubes 10 to communicate freely with the atmosphere. The said tube ends directly overlie the inclined or conical wall of the hood, and the holes 12 are located opposite said wall, so that the in-coming air is deflected upwardly toward the tube ends.

The lower or bottom plate 9 of the recuperation chamber rests on the upper part of conical hood 4, and chimney 5 passing through said plate, opens out at a suitable height into the recuperation chamber.

In order to properly distribute and direct hot gases within the recuperation chamber previous to their being discharged through the chimney, a small concavo-convex disk 13, which may be made of fireproof material, is located at the end of chimney 5, with its concave face directed downwards. Hot gases arriving through the chimney at some speed impinge on said disk which deflects them from their vertical path in directions perpendicular to said path, thus causing them to heat uniformly the outer surfaces of ventilator tubes 10.

Outer envelope or shell 7 is provided at its lower part with an opening 14 permitting hot gases to escape and be led to the chimney. But, in order more completely to utilize the heat of said gases previous to their discharge, I position in front of opening 14 a plate 15, of arcuate or other suitable section, which extends almost the entire height of the recuperation chamber. Said plate forms, together with the wall of chamber 6, a compartment 16 of arcuate section which communicates at its top part with the top part of the chamber. Due to this arrangement hot gases will only be able to escape slowly from the heater on their way to the chimney, because they travel through an extended path as shown by full line arrows. I thus obtain a better utilization of their heat and therefore, better efficiency.

The main body of my apparatus may, if required, be surrounded with or enclosed in a perforated envelope or outer shell 17 permitting ambient air to come into contact with shell 7.

This arrangement prevents intensive lateral radiation from the apparatus. The side walls of the apparatus, therefore, remain only warm, and there is no danger of their burning the clothes or skin of a person coming close thereto.

Furthermore my apparatus may, if desired, be topped with a capital or cap 18 provided with wide apertures 19 permitting the upper ends of tubes 10 to communicate freely with the atmosphere.

The above described apparatus heats, through suitable connections, the air contained in a room.

Tubes 10, due to the path followed by hot gases inside chamber 6 owing to the afore described arrangement, absorb almost the whole of the heat produced. Due to such heating said tubes continuously and automatically suck in cold air through their lower ends and discharge it into the atmosphere through their upper ends at a substantially raised temperature which may reach up to about 400 degrees C.

There is produced in this manner a continuous flow of the room air through those tubes, such air becoming heated by contact with the tubes and rapidly raising the temperature in the room to be heated.

The dot-and-dash arrows indicate the path of sucked-in air through said tubes.

Once the desired temperature has been obtained, the burner may be adjusted and said temperature kept up with but small fuel consumption.

I wish it to be clearly understood that the foregoing description is given merely as an example of a method of construction of my apparatus and that I do not intend my invention to be limited thereto since I reserve the right to modify the same as well as constructional details of the ventilator and of the burner in any way without departing from the scope of my invention. Instead of making it cylindrical in shape I may build my apparatus in such a manner that all its component parts will be housed in a square, rectangular, elliptical or other envelope, shell or casing, while securing the above described advantages.

Furthermore, the heating apparatus which is the object of my invention is not limited to gas heating, but may be utilized for heating by means of any other gaseous or liquid fuels suitable to be burned in or by a burner and even by means of any fuel that can be burned beneath the conical hood or funnel leading the hot gases to the recuperation chamber.

Having now particularly described and ascertained the nature of my said invention as well as a manner in which the same is to be performed, I declare that what I claim is:

In a heater, the combination of a base; a burner mounted thereon; a hood mounted above the burner and comprising a conical body, and a central cylindrical chimney projecting upwardly therefrom; a supporting jacket enclosing the hood; a recuperation chamber supported on said jacket and into which the hood chimney extends, said chamber comprising perforated top and bottom tube plates and a circumferential wall or casing connecting the same and provided with an outlet for the products of combustion; a set of air tubes disposed in said chamber around said chimney and fitted at opposite ends in the openings in the tube plates, said tubes having their lower ends directly overlying the conical wall of the tube body, and said jacket having a series of air inlets which are located opposite said wall, whereby the incoming air is deflected upwardly toward said overlying tube ends; a vertical baffle plate supported within said chamber upon the bottom tube plate and disposed opposite said outlet and in spaced relation to the portion of the casing wherein the outlet is formed, said baffle plate terminating short of the top tube plate at its upper end so as to cause the products of combustion to travel upwardly along the tubes for substantially their entire length and to pass over the said upper end of the baffle plate in order to descend between the latter and the casing to reach said outlet; and a member surmounting the combustion chamber and having an outlet for the heated air.

In testimony whereof I affix my signature.

RENÉ FAURE.